United States Patent [19]
Juraco et al.

[11] Patent Number: 6,101,800
[45] Date of Patent: Aug. 15, 2000

[54] FIELD CHOPPING APPARATUS

[76] Inventors: Albert F. Juraco, 15985 Nichols Rd., Green Valley, Ill. 61534; Jamie L. Adams, R.R. 1, Box 46, Metamora, Ill. 61548

[21] Appl. No.: 09/178,773

[22] Filed: Oct. 26, 1998

[51] Int. Cl.$^7$ .................................................. A01D 49/00
[52] U.S. Cl. ............................. 56/504; 56/52; 56/DIG. 1; 56/DIG. 9
[58] Field of Search ................. 56/500, 504, DIG. 1, 56/DIG. 9, 2, 16.7, 52

[56] References Cited

U.S. PATENT DOCUMENTS

| | | | |
|---|---|---|---|
| 3,357,467 | 12/1967 | Morkoski | 241/32 |
| 3,638,406 | 2/1972 | Scherer et al. | |
| 3,815,958 | 6/1974 | Dietrich | |
| 3,861,079 | 1/1975 | Patterson | |
| 3,935,891 | 2/1976 | McCloud | |
| 4,387,930 | 6/1983 | Hunt | |
| 4,589,252 | 5/1986 | Williams | 56/255 |
| 4,603,916 | 8/1986 | Granryd | 301/45 |
| 4,694,872 | 9/1987 | Granryd | |
| 4,735,038 | 4/1988 | Williams | 56/255 |
| 4,822,108 | 4/1989 | Benhart | |
| 5,269,126 | 12/1993 | Kalverkamp et al. | |
| 5,404,699 | 4/1995 | Chrintensen et al. | |
| 5,662,172 | 9/1997 | Brown | 172/22 |

*Primary Examiner*—Thomas B. Will
*Assistant Examiner*—Arpad Farian Kovacs
*Attorney, Agent, or Firm*—Mark E. Wiemelt

[57] ABSTRACT

A chopping apparatus for cultivating crop fields that mounts to at least one of the wheels of an agricultural vehicle, tractor or like vehicle comprising a plurality of blades attached to a plurality of spaced arms. The plurality of spaced arms extend outwardly and lock in a fully extended position to consecutively chop foliage and thereafter scoop, plunge and generally penetrate field soil when the agricultural vehicle is in motion and the corresponding wheel is rotating. A second locked arm position accommodates vehicle transportation by retracting the blades inwardly and proximate a center portion of the agricultural vehicle wheel. Each arm is spring biased to facilitate blade impact with a rigid object, such as a rock or the like, by allowing each arm to travel inwardly when a substantial force is imparted on any of the blades.

14 Claims, 11 Drawing Sheets

POSITION A

FIELD CHOPPING APPARATUS

FIELD OF THE INVENTION

The present invention relates generally to a rotating chopping apparatus operating as a field chopper and row destroyer. More particularly, the present invention relates to an apparatus readily adaptable to an agricultural vehicle wheel or rim having a plurality of retracting bladed arms extending proximate a circumference of a tire to chop corn stalks or the like.

BACKGROUND OF THE INVENTION

In certain agricultural applications, such as the growing of hybrid seed corn, it is necessary to destroy male corn rows after their pollen has been transferred to the female rows of corn. The destruction of the male rows must occur prior to the harvest of the female rows or the quality of hybrid seed may be jeopardized. Machines heretofore used to perform the task of male row destruction were merely adapted self-propelled sprayer systems having an original or main purpose of spreading fertilizer, herbicides, or pesticides on fields. Generally, adapting such machines to perform row destroying requires an operator to first remove a large front mounted sprayer boom structure, hydraulic hoses and chemical hoses from an agricultural vehicle. Second, the operator attaches a similar front mounted structure, incorporating a chopping mechanism, to the agricultural vehicle, ensuring all the hydraulic hoses are properly connected.

Agricultural vehicle operators generally experience steering difficulties with the adapted sprayer machine since the front mounted chopping structure operates as a rigid vehicle axle which does not facilitate turning. Additionally, operators commonly add weights to the front end of the agricultural vehicle, adding even more difficulty and labor to the adaptation process. Generally, removing the large front mounted sprayer boom structure, attaching the front mounted row destroyer, removing the front mounted row destroyer, and replacing the large front mounted sprayer boom structure is laborious, time-consuming and expensive.

SUMMARY OF THE INVENTION

Briefly, and in accordance with the foregoing, the invention discloses a novel chopping apparatus easily adapted to at least one wheel of an agricultural vehicle. The chopping apparatus utilizes rotating armed blades mounted directly to one of the wheels of an agricultural vehicle. The arms include blades disposed to destroy male corn rows in a hybrid corn producing field. The principle of operation governing the chopping apparatus includes pressing blades into the ground to chop corn stalk and penetrate soil. More specifically, the chopping apparatus mounts on at least one tire carrying wheel of an agricultural vehicle or like vehicle. A base has holes which align with holes within a hub of the agricultural vehicle wheel. The base abuts and mounts thereupon the hub and becomes affixed thereto with a plurality of nuts and bolts. A plurality of spaced arms rotatably attach to an outer periphery of the base at a first end of each of the arms. A second end of each of the arms extends radially and outwardly therefrom. Each of a plurality of blades removably attaches to each second end of the arms.

The first end of each of the arms is pivotally attached to the base. A pair of spaced parallel projecting ears connect to the base and each ear has an aperture therethrough to support a pin or bolt being inserted therein. Between the parallel ears, each first end of each of the arms fits therebetween and the pin generally restrains each arm movement to rotation in a single plane outwardly and radially relative to said base.

Each of the arms has the ability to lock in either a retracted position or an extended position. A locking means utilizes two pairs of slots in each pair of ears to facilitate a biased tab member communicative with both pair of slots. Each tab member has a pair of tab portions which fit within a first pair of slots and locks each arm in the retracted position and a second pair of slots accommodate the tab member to lock each of the arms in the extended position.

Each of the arms of the chopping apparatus has means for absorbing an impact when any of the blades strikes a rigid object. A spring, one of the arms and a corresponding blade comprise each of the impact absorption means. Each of the arms, having an the aperture therein, is spring biased so that the spring forces each arm to fully extend. However, when one of the blades strikes a rigid object the corresponding arm is displaced radially and inwardly.

Accordingly, it is a general object of the present invention to provide an apparatus for attaching to an existing wheel of an agricultural vehicle or like agricultural vehicle for rotationally chopping corn fields and the like. It is a more particular object of the present invention to provide a chopping apparatus which utilizes a plurality of spaced blades extending outwardly and attached to an existing agricultural vehicle wheel to generally chop foliage and penetrate row soil.

Another general object of the present invention is to provide a chopping apparatus which is easily installed on an existing agricultural vehicle wheel.

Another general object of the present invention is to provide a chopping apparatus that uses blades pressed into the ground by a portion of the weight of the agricultural vehicle without decreasing substantially the downward force normally sustained by the agricultural vehicle's tires.

Another general object of the present invention is to provide a chopping apparatus that once installed, is retractable, and does not require removal during non-farming usages, such as transportation.

Another general object of the present invention is to provide a chopping apparatus that mechanically locks the bladed arms in either a retracted or extended position without the use of hydraulic components.

Another general object of the present invention is to provide a chopping device that accommodates radial movement of the bladed arms when any of the blades strike a rigid object when the arms are in the extended and locked position.

These together with other objects of the invention, along with the various features of novelty which characterize the invention, are pointed out with particularity in the detailed description annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The foregoing and other additional objects of the present invention will be readily appreciated by those skilled in the art upon gaining an understanding of the invention as described in the following detailed description and shown in the accompanying drawings in which.

DETAILED DESCRIPTION OF THE INVENTION

While the invention may be susceptible to embodiments in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 1:
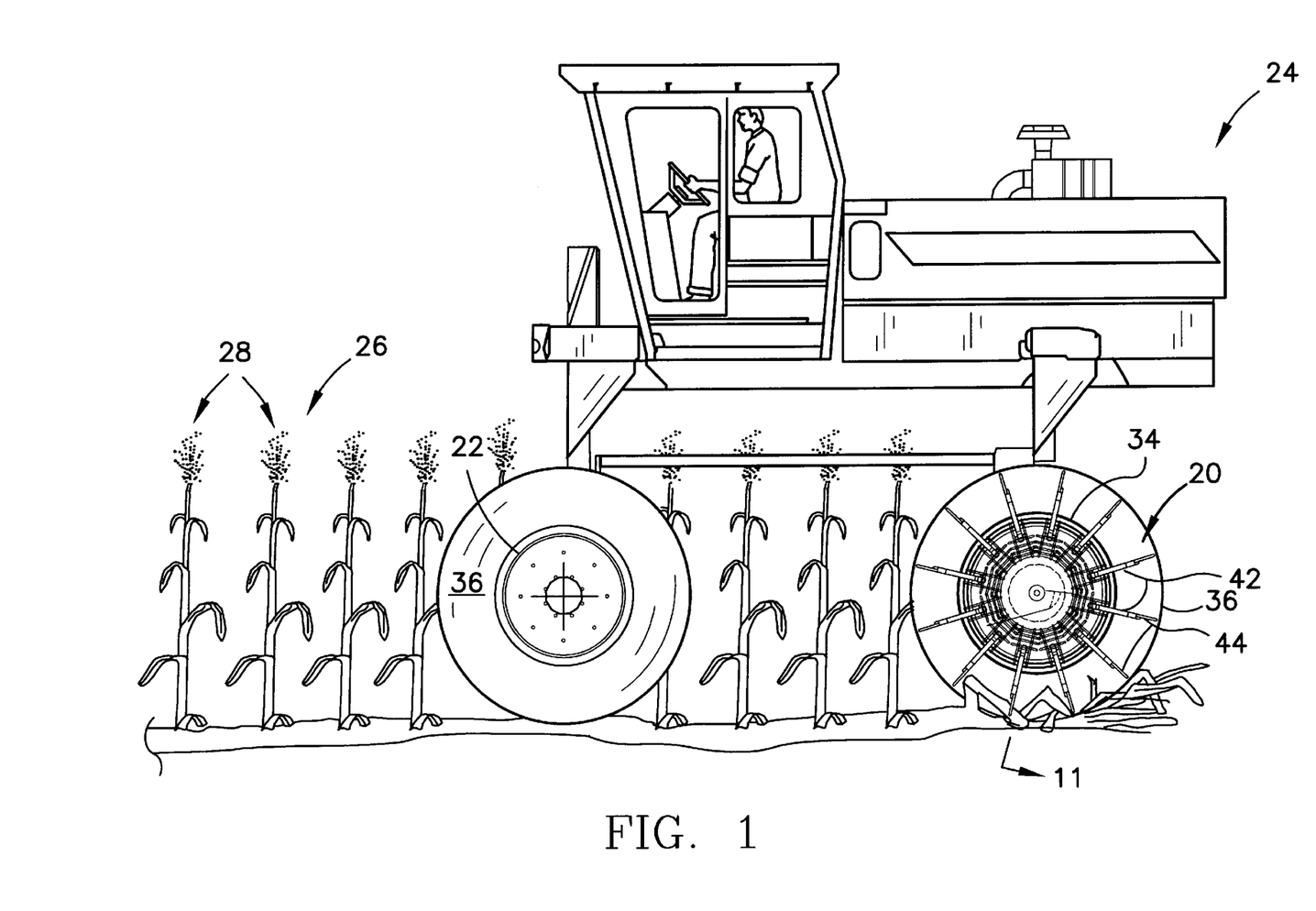
FIG. 1 is a perspective view of an agricultural vehicle utilizing the present invention chopping apparatus on a corn field.
Figure 2:
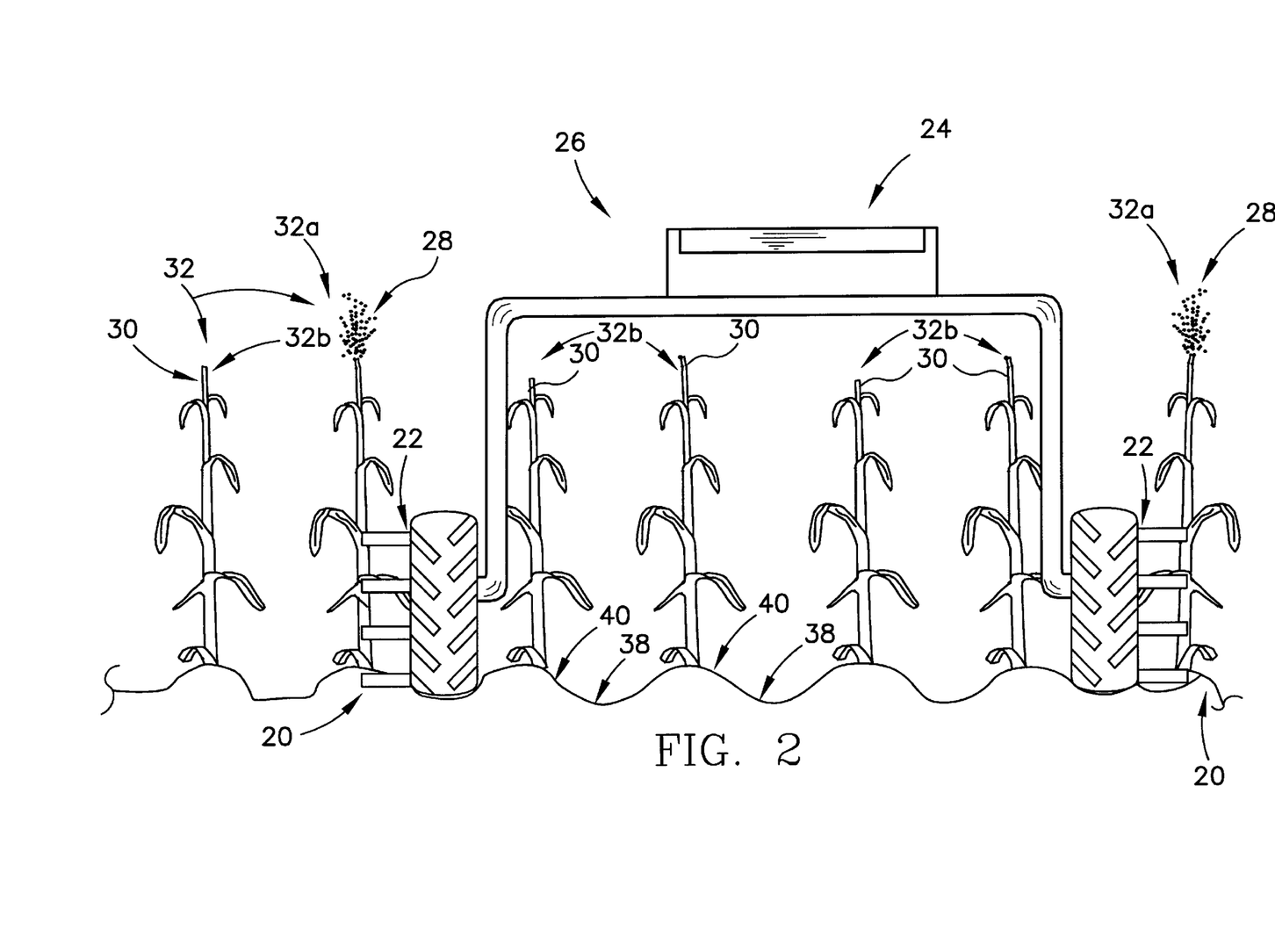
FIG. 2 is a front elevational view of the agricultural vehicle shown in FIG. 1, being utilized in a hybrid corn producing field.

As shown in FIGS. 1 and 2, a chopping apparatus 20 of the preferred embodiment is mounted on each one of the rear wheels 34 of an agricultural vehicle 24. Generally, the agricultural vehicle 24, is used to cultivate or harvest a corn field 26. More specifically, in the corn growing industry, male corn plants 28 are often introduced into a field 26 to pollinate female corn plants 30. Once the female corn plants 30 are pollinated, the male corn plants 28 must be removed or otherwise destroyed to maximize the yield of hybrid corn. The male corn plants 28 and female corn plants 30 are segregated by rows 32 wherein single male rows 32a, generally including male corn plants 28 only, are generally separated by female rows 32b of which the female rows 32b generally include female corn plants 30 only. In the preferred embodiment, a farmer designing the content and spacing of corn rows 32 sets up his or her field 26 so that a chopping apparatus 20 is attached to each of the rear wheels 34 of an agricultural vehicle 24, tractor or other like vehicle and four consecutive female rows 32b separating the male rows 32a pass safely thereunder the moving agricultural vehicle 24 while the chopping apparatus 20 on each of the rear wheels 34 destroys the male rows 32a. It will be readily understood by those skilled in the art that the chopping apparatus 20 may also be mounted to each of the two front wheels 22 of the agricultural vehicle to destroy male corn rows 32a.

Referring now to FIG. 2, a chopping apparatus 20 is shown mounted on each of the rear wheels 34 of an agricultural vehicle 24. Generally, one of the rear wheels 34 and one of the front wheels 22 of an agricultural vehicle having tires 36 mounted thereto, ride in recessed portions or valleys 38 of the field 26. Male corn plants 28 and female corn plants 30 generally sprout and extend from raised row portions or ridges 40 of the field 26. Each of the ridges 40 generally extends upwardly and beyond each of the corresponding valleys 38 to foster efficient hydration and cultivation of the male corn plants 28 and female corn plants 30. Furthermore, alternating valleys 38 and ridges 40 lends to efficient access for chopping and destroying apparatuses such as each chopping apparatus 20 attached to the agricultural vehicle 24, to avoid trampling crops by the rear wheels 34 and front wheels 22 of the agricultural vehicle 24.

Figure 3:
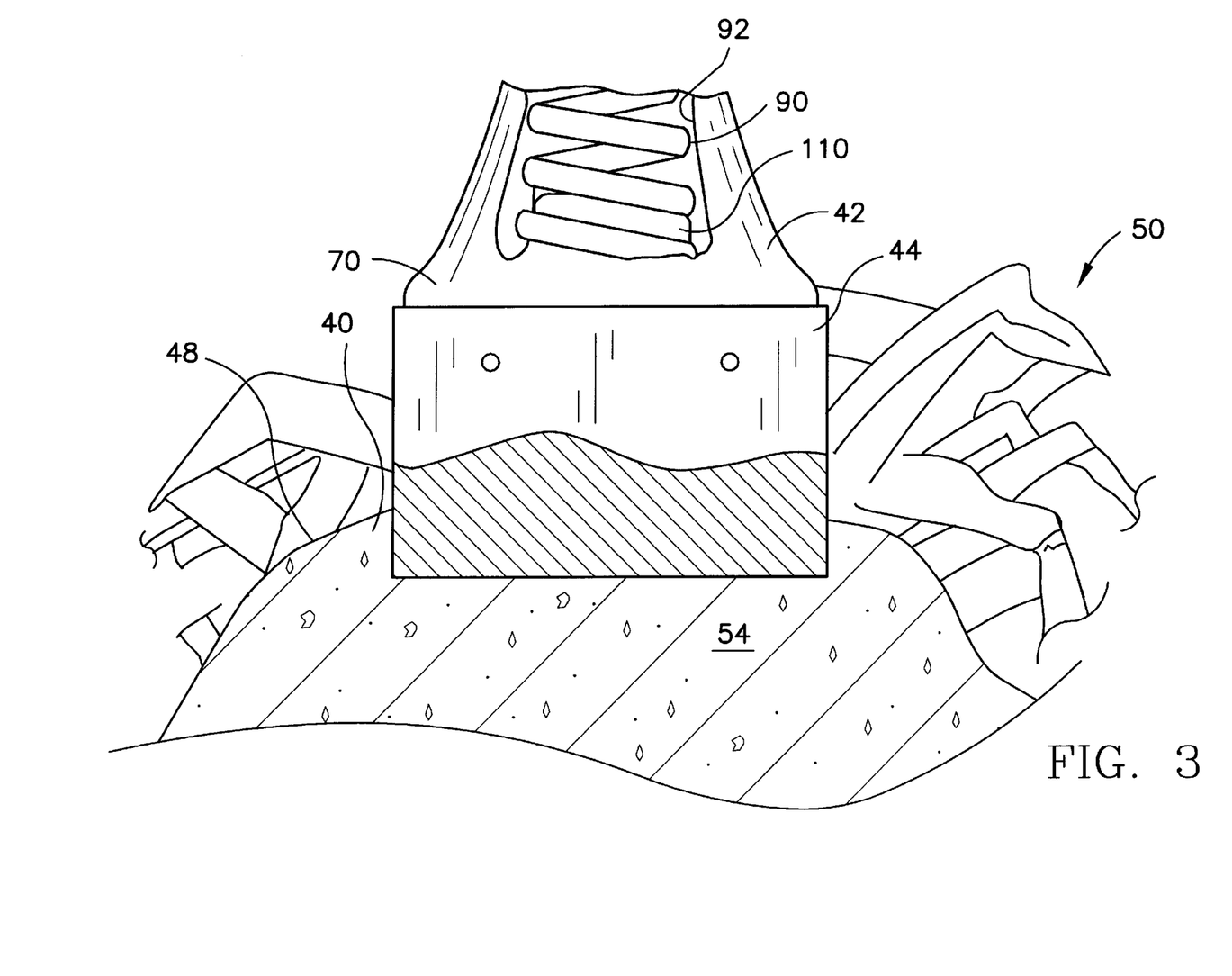
FIG. 3 is an enlarged cross-sectional view of one of the bladed arms of the present invention chopping apparatus being utilized on a ridge of a corn row taken along the lines 3—3 of FIG. 4.
Figure 4:
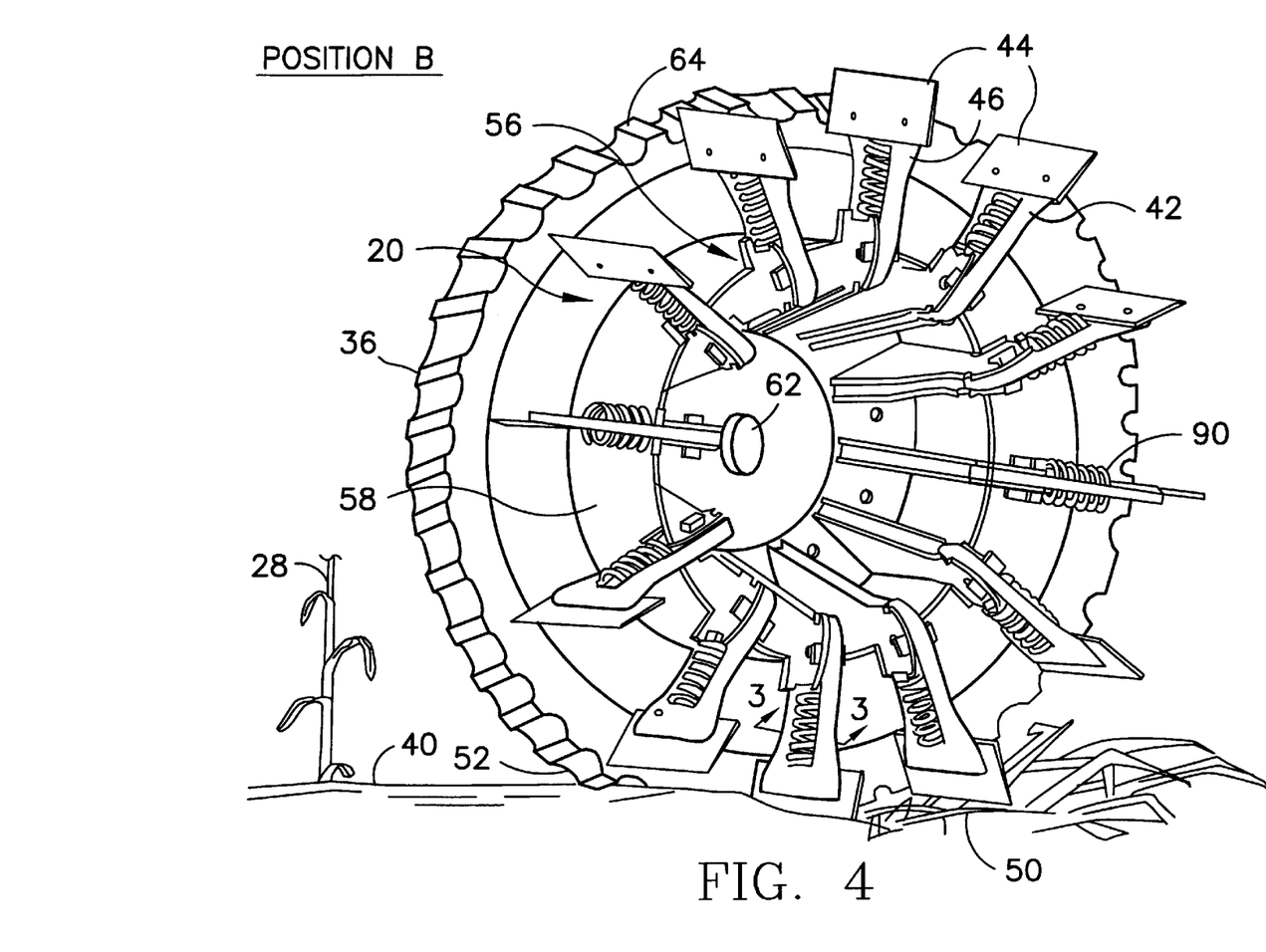
FIG. 4 is a side elevational view of one of the agricultural vehicle's wheels in FIG. 1, utilizing the present invention chopping apparatus and having all the arms locked in an extended position B.

Referring now to FIGS. 3 and 4, each chopping apparatus 20 includes a plurality of spaced arms 42 and a corresponding plurality of blades 44, one of each of the blades 44 attaches at an outermost portion 46 of each of the arms 42. The preferred embodiment of the chopping apparatus 20 discloses a plurality of arms 42, however the chopping apparatus 20 is not so limited and may include any number of arms 42. Moreover, each component of the chopping apparatus 20, utilizes metallic materials of construction, such as a carbon steel, however, each component of the chopping apparatus 20 may be comprised of any one of a host of metallic materials of construction.

In FIG. 3, one of the arms 42 is shown with one of the blades 44 attached thereto. Each of the blades 44 substantially penetrates a surface 48 of one of the male rows 32a at one of the ridges 40 when each of the blades 44 is generally vertical and directed substantially perpendicular and into the surface 48 of one of the male rows 32a. Substantially contemporaneous with each of the blades 44 contacting the surface 48 of one of the male rows 32a, each of the blades 44 chop foliage 50 including corn stalks and other vegetative matter into smaller portions to facilitate destruction and thereafter biodegradation of the male corn plants 28.

FIG. 4 displays the chopping apparatus 20 having arms in an extended position B wherein the blades 44 are proximate a contact portion 52 of the field 26 and the tires 36 of the agricultural vehicle 24 contact the field 26 at one of the valleys 38. The surface 48 of each of the male rows 32a is consecutively contacted by the blades 44. The blades 44, consecutively penetrate, plunge and rotationally scoop downwardly, substantially contemporaneously chopping foliage 50 and penetrating soil 54 of each of the male rows 32, while the agricultural vehicle 24 is in motion. The rear wheels 34 of the agricultural vehicle 24 generally ride in the valleys 38 (shown in FIG. 2) and the blades 44 of each chopping apparatus 20 rotate and penetrate the soil 54 at the ridges 40, outside and adjacent each of the corresponding agricultural vehicle rear wheels 34.

Figure 5:
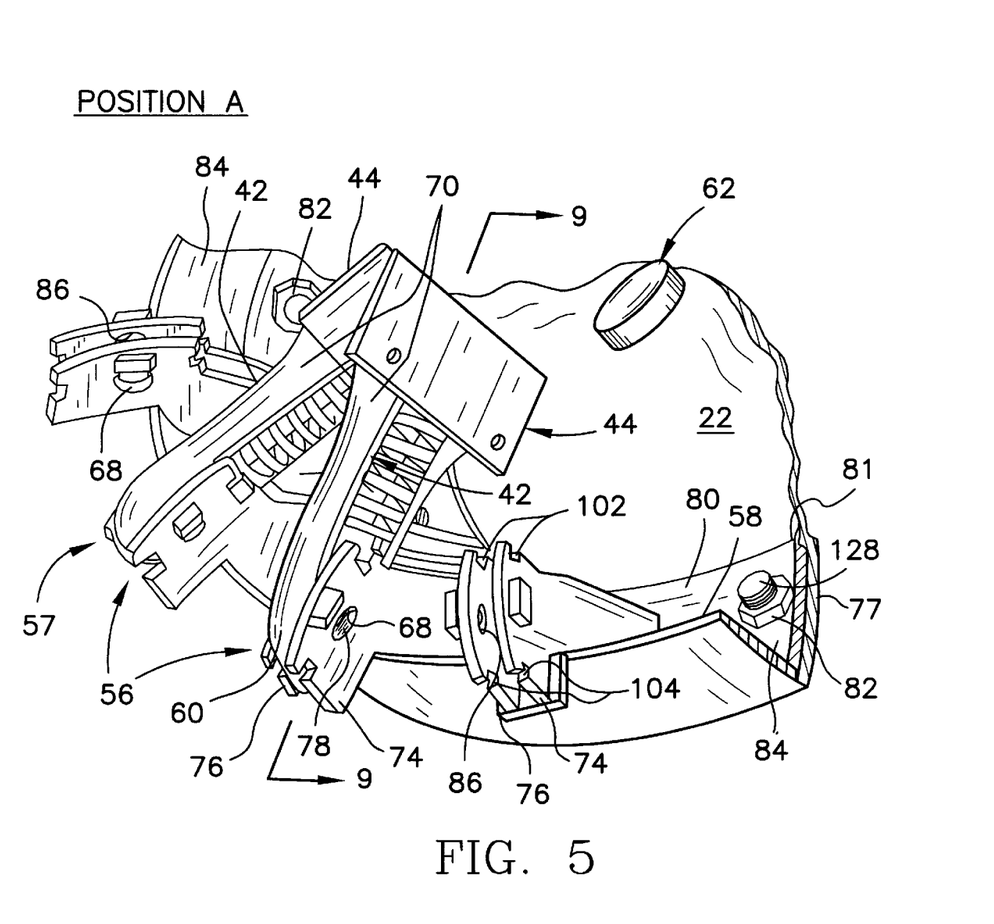
FIG. 5 is a partial side elevational view of the present invention chopping apparatus displaying the bladed arms locked in the retracted position A and displaying the fastening relationship between an agricultural vehicle wheel and the novel chopping apparatus.
Figure 12:
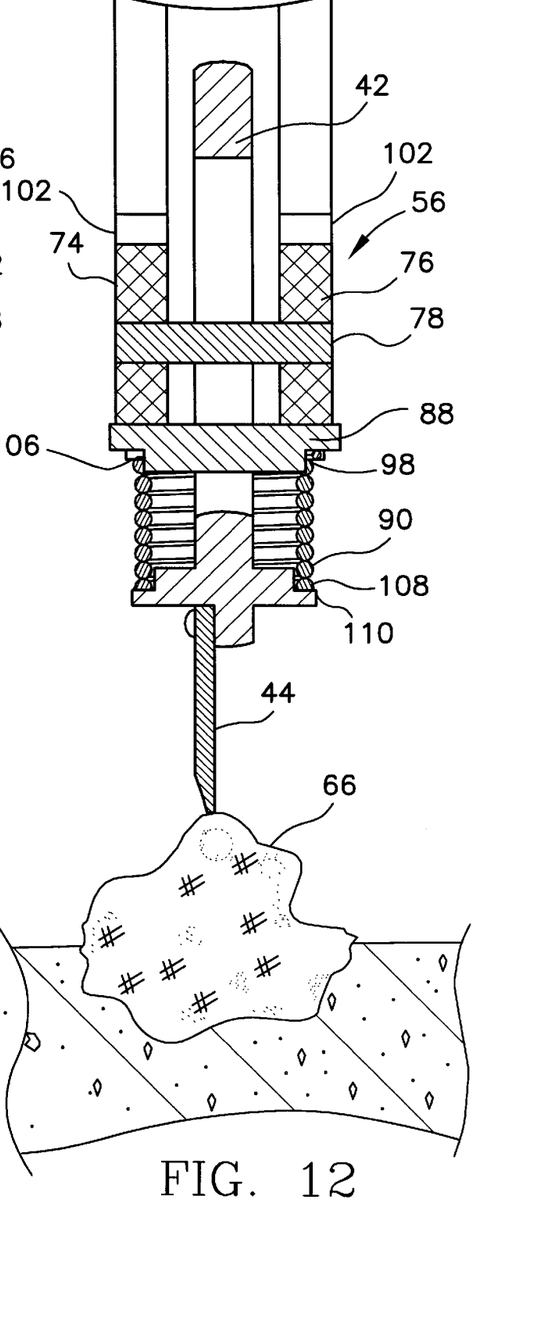
FIG. 12 is the novel chopping apparatus displayed in FIG. 11 shown absorbing the impact from one of the blades striking a rigid object.
Figure 14:
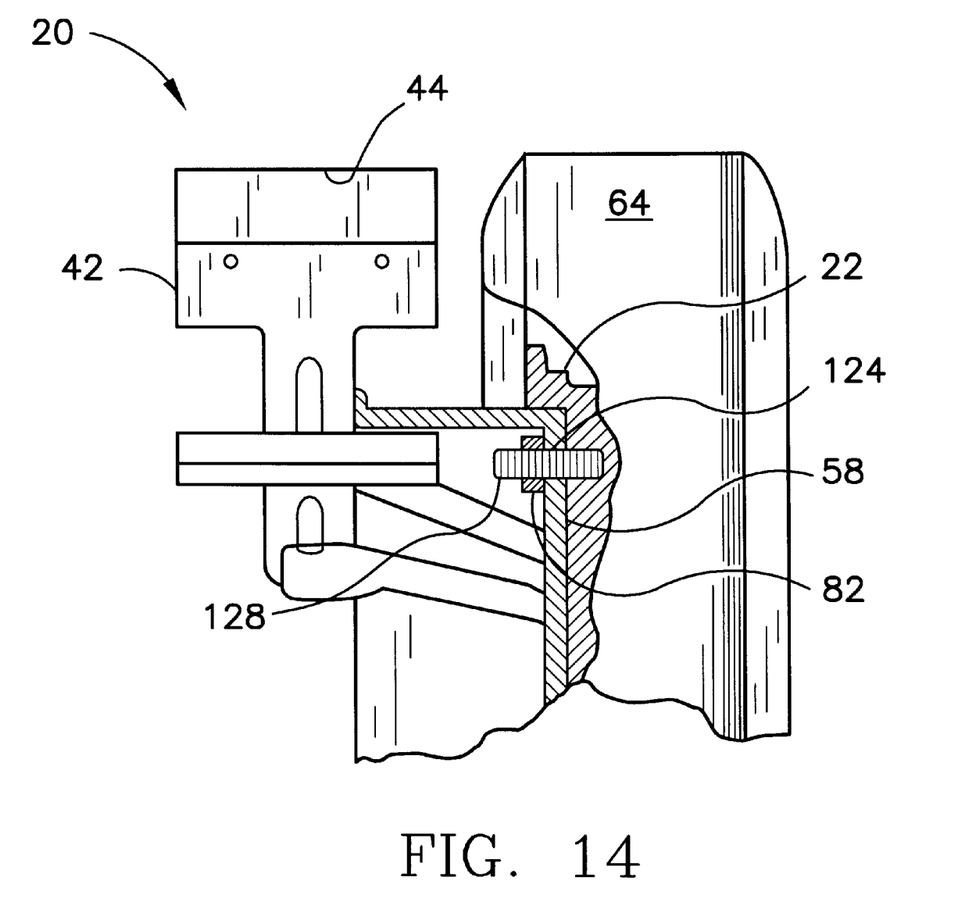
FIG. 14 is a partial cross-sectional view along the lines 14—14 of FIG. 6 displaying the mounting between the base and the agricultural vehicle's wheel.

Referring now to FIG. 5, a chopping apparatus 20 of the preferred embodiment is shown in the retracted position A and shown comprising a base 58, a plurality of connecting means 56, a plurality of locking means 57, and the corresponding plurality of arms 42, the arms 42 being radially spaced. Each of the arms 42 includes a first end 60 and a second end 70. The base 58 is mounted to each of the rear wheels 34 of the agricultural vehicle 24 (as shown in FIGS. 1, 4 and 14). The base 58, each of the arms 42, each of the blades 44, and each of the connecting means 56 are preferably constructed from a metallic material such as carbon steel. The connecting means 56 pivotally connect each first end 60 of each of the arms 42 to the base 58. Each of the arms 42 pivots about its respective first end 60 and has the capability to rotate 180 degrees, in a single plane, from a retracted position A wherein each of the blades 44 is proximate to a center portion 62 of each of the rear wheels 22, to an extended position B (see FIG. 4, all arms 42 extended) wherein each of the blades 44 is adjacent and proximate a tread surface 64 of the tires 36. Each of the arms 42, when in the extended position B, has limited capability to move or translate in the radial direction (generally in the direction measured from the tread surface 64 to center portion 62 of each of the rear wheels 34) when each of the blades 44 of the chopping apparatus 20 strikes a generally rigid object 66, such as a rock as shown in FIG. 12.

The locking means 57, hereinbelow described, rigidly fixes each of the arms 42 in either the extended position, B to facilitate chopping the field 26, or a retracted position A, to facilitate safe transportation of the agricultural vehicle 24 fitted with at least one chopping apparatus 20. Each chopping apparatus 20 also includes an impact absorption means 67, hereinbelow described, so that when at least one of the blades 44 strikes the generally rigid object 66, one of the arms 42, corresponding to one of the blades 44, will travel a limited distance, in a radial direction relative to the agricultural vehicle's rear wheels 34, to absorb the energy of the impact and avoid destruction of the arms 42, blades 44, and attaching means 56.

FIG. 5 displays arms 42 in the retracted position A to facilitate transportation of the agricultural vehicle 24 when such agricultural vehicle 24 is not cultivating the field 26. Each of the arms 42 has a first end 60 and a second end 70. The first end 60 of each of the arms 42 are attached to the corresponding connecting means 56 while the second end 70 of each of the arms 42 are positioned inward and proximate to the center portion 62 of each of the rear wheels 34. The locking means 57 engage and restrain each of the corresponding arms 42 in the retracted position A to prevent one or more arms 42 from flailing and possibly striking a roadway during non-cultivating use of the agricultural vehicle 24.

FIG. 5 more specifically displays the base 58 of the preferred embodiment, the relationship of each of the arms 42 with each of the corresponding connecting means 56 and the relationship of each of the connecting means 56 with the base 58. The base 58 includes a generally planar circular first surface 80 including a base aperture 81 therethrough and substantially concentric thereto. The base 58 includes a second surface 84, generally planar and projecting generally perpendicular and outwardly from a periphery 77 of the base 58. Each of the connecting means 56 of the preferred embodiment includes a first ear 74, a second ear 76, the first end 60 of each of the corresponding arms 42, a pin 78 and the base 58. Each first ear 74 and second ear 76 of the connecting means 56 rigidly connects, by way of welding, threaded fasteners or the like, to the first surface 80 of the base 58 proximate the periphery portion 77 thereof, although it will be generally understood by those skilled in the art that the first ear 74, second ear 76 and base 58 may be integrally formed. Generally, the first surface 80 of the base 58 is disposed vertically and defines base holes 124 and the hub 130 of each of the rear wheels 34 defines hub holes 132 which provide for cooperative engagement with the base holes 124 by nut 82 and bolt 128 combinations which mounts the base 58 to each of the rear wheels 34. Each first ear 74 and each second ear 76 attaches to the second surface 84 of the base 58. The second surface 84 of the base 58 is generally substantially concentric with the tread surface 64 (shown in FIG. 4) of each of the tires 36. The first ear 74 and the second ear 76 are substantially parallel and the first end 60 of each of the corresponding arms 42 is rotatably disposed therebetween. Each first ear 74 has a first ear aperture 68 therethrough aligning with a second ear aperture 86 therethrough the second ear 76. The pin 78 interferingly fits therein each first ear aperture 68 and second ear aperture 86 while allowing each of the arms 42 to freely move about each pin 78. Each of the arms 42 is generally elongated having an elongated aperture 92 therethrough to facilitate both translational and rotational movement of each of the arms 42 about each pin 78. It should be readily understood that one having ordinary skill in the art could utilize a clevis for each connecting means 56.

Figures 6, 7, 8:
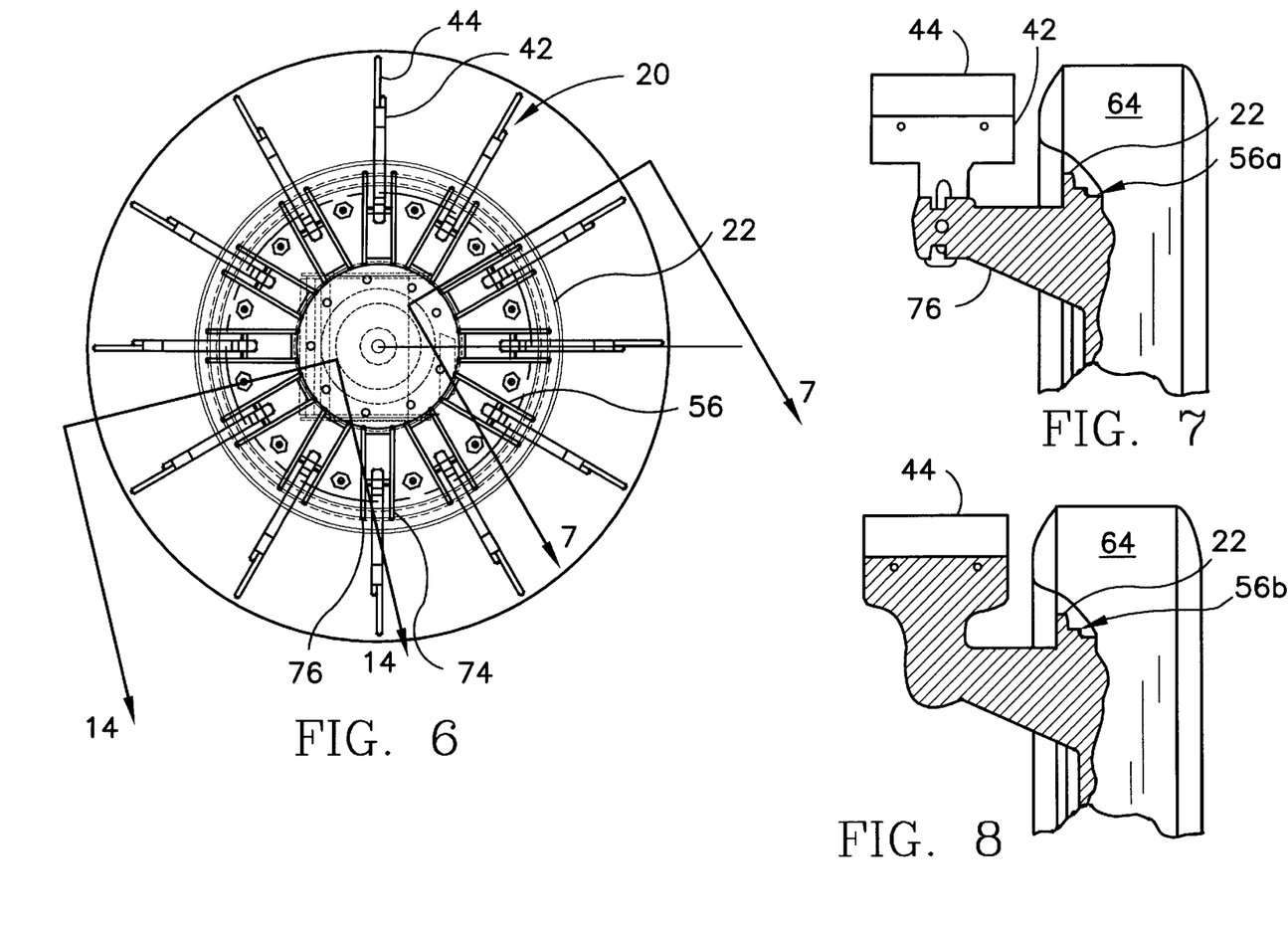
FIG. 6 is a side view of the novel chopping apparatus which incorporates the features of a second embodiment of the invention.
FIG. 7 is a partial cross-sectional view along the lines 7—7 of FIG. 6 displaying the agricultural vehicle's wheel integrally incorporating components of the connecting means of the novel chopping apparatus.
FIG. 8 is the novel chopping apparatus of FIG. 7, however, incorporating the features of a third embodiment of the invention which displays the unitary nature of several components of the novel chopping apparatus.

FIGS. 6 and 7 display an alternate embodiment of the chopping apparatus 20, having connecting means 56a. Each of the connecting means 56a are integral therewith or rigidly attached thereto the rear wheels 34, thus eliminating the need for the base 58.

FIG. 8 displays yet another embodiment of the chopping apparatus 20, wherein the connecting means 56b are rigidly fixed to the base 58 and the arms 42 are rigidly attached to the connecting means 56b. It should be readily understood that one having ordinary skill in the art could utilize the connecting means 56b rigidly fastened to each of the arms 42 with either the integral connection of each first ear 74 and each second ear 76 to each of the rear wheels 34 or to the base 58.

Figure 9:
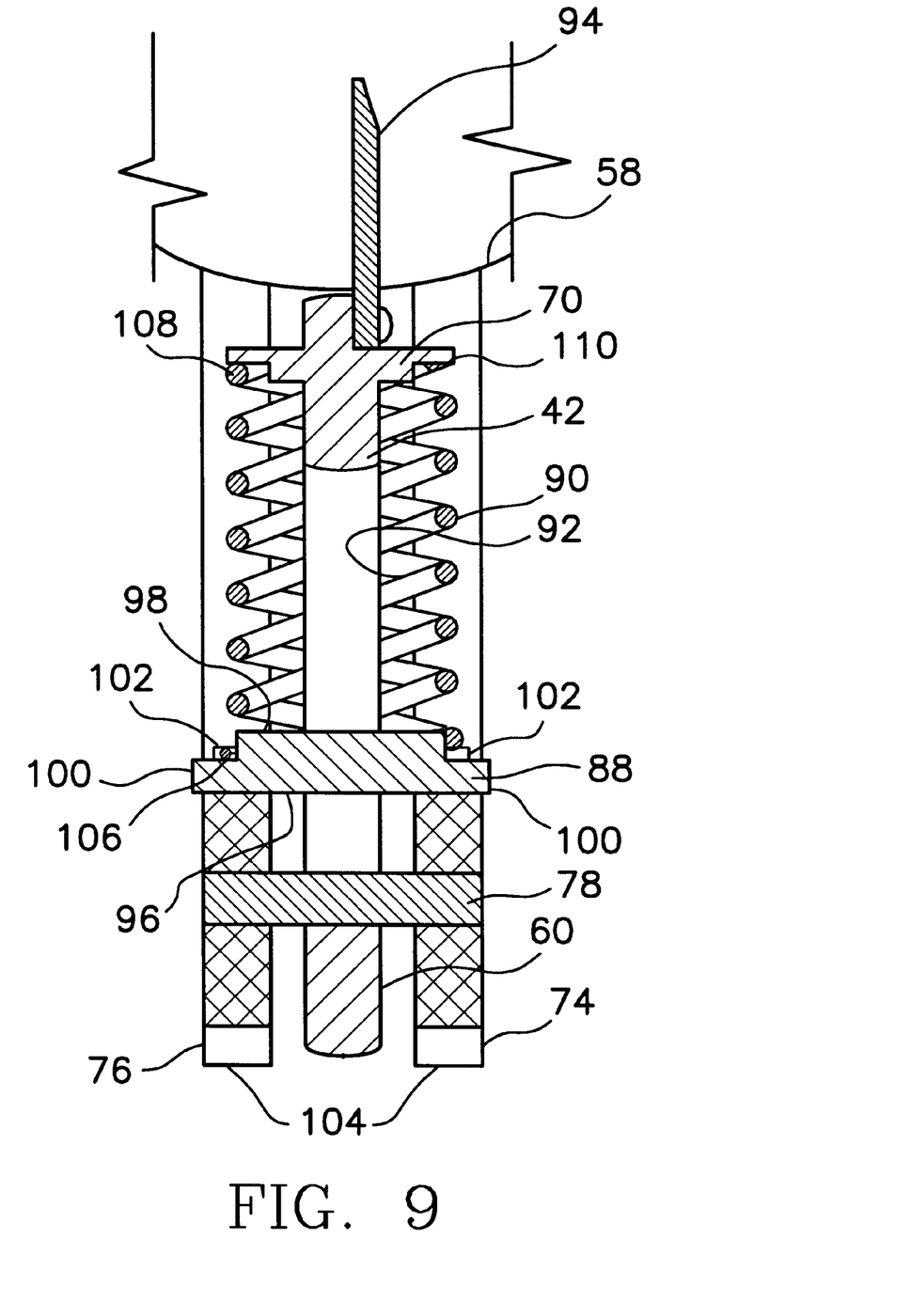
FIG. 9 is an enlarged partial cross-sectional view of a novel chopping apparatus which displays the locking structure of one of the arms taken along lines 9—9 of FIG. 5.

Referring now to FIG. 9, one of the locking means 57 comprises: one of the arms 42, a tab member 88, a spring 90, the first ear 74, and the second ear 76. It should be readily understood by those skilled in the art that spring 90 may be interchangeable with any like resilient member. The locking means 57 generally operates by way of the reciprocative, floating, biased tab member 88 fitting into the aperture 92 within each of the arms 42, causing each of the arms 42 to be locked or generally restrained. More specifically, a tab member 88 is unidirectionally restrained within the aperture 92 of each of the arms 42 wherein the tab member 88 of each locking means 57 reciprocates in the plane defined by the first end 60 of each of the corresponding arms 42 and the second end 70 of the arms 42. The tab member 88 comprises a first end 96 of the tab member 88 proximate the first ear 74 and the second ear 76 and a second end 98 of the tab member 88 facing each one of the corresponding blades 44.

The first end 96 of the tab member 88 includes a pair of tab portions 100 communicative with a first pair of slots 102 within the first ear 74 and the second ear 76. The first pair of slots 102 face the center portion 62 of the base 58 and upon receiving the tab portions 100 of the tab member 88, lock each of the arms 42 in the retracted position A (blades 44 facing the center portion 62 of the base 58). A second pair of slots 104 within the first ear 74 and the second ear 76 are generally opposite thereto the first pair of slots 102 and face outwardly in the direction of the tread surface 64. The second pair of slots 104 receive the tab portions 100 of the tab member 88 and lock each of the corresponding arms 42 in the extended position B (blades 44 facing outwardly and in the direction of the tread surface 64). It should be readily understood by those skilled in the art that any comparable detent mechanism may suffice to lock the arms 42 in either the retracted position A or the extended position B.

The spring 90 has a first end 106 and a second end 108. The first end 106 of the spring 90 contacts the second end 98 of the tab member 88. The second end 108 of the spring 90 contacts a seat 110, wherein the seat 110 is integral with the second end 70 of each of the arms 42. The spring 90 exerts a force on the tab member 88 to provide an affirmative locking engagement between the tab member 88, the first ear 74 and the second ear 76. To change position of each of the arms 42, when each of the arms 42 is in the retracted position A, a user manually displaces the tab portions 100 from their respective pair of slots 102 by applying a force exceeding the force exerted by the spring 90. Conversely, to change position of each of the arms 42, when each of the arms 42 is in the extended position B, a user manually displaces the tab portions 100 from their respective pair of slots 104 by applying a force exceeding the force exerted by the spring 90. When the arms 42 are in the retracted position and a user wishes to move the arms 42 to the extended position he or she dislodges the tab portions 100 from the slots 102 and rotates each of the arms 42 outward or toward the tread surface 64 of the tires 36. The first ear 74 and the second ear 76 include cammed portions 112 proximate and therebetween the first pair of slots 102 and the second pair of slots 104. When each of the arms 42 is manually rotated from either the retracted position A or the extended position B, the tab portions 100 slidingly engage cammed portions 112 (shown in FIG. 13). When the tab portions 100 contact the cammed portions 112 on the first ear 74 and the second ear 76, the force exerted by the spring 90 on the tab member 88 is insubstantial so that a user may easily rotate the arms 42 between the retracted and locked positions. It should be readily understood by those skilled in the art that the spring 90 is interchangeable with any biasing member providing a force on the tab member 88 to affirmatively restrain the tab member 88 within the first ear 74 and the second ear 76.

Figure 10:
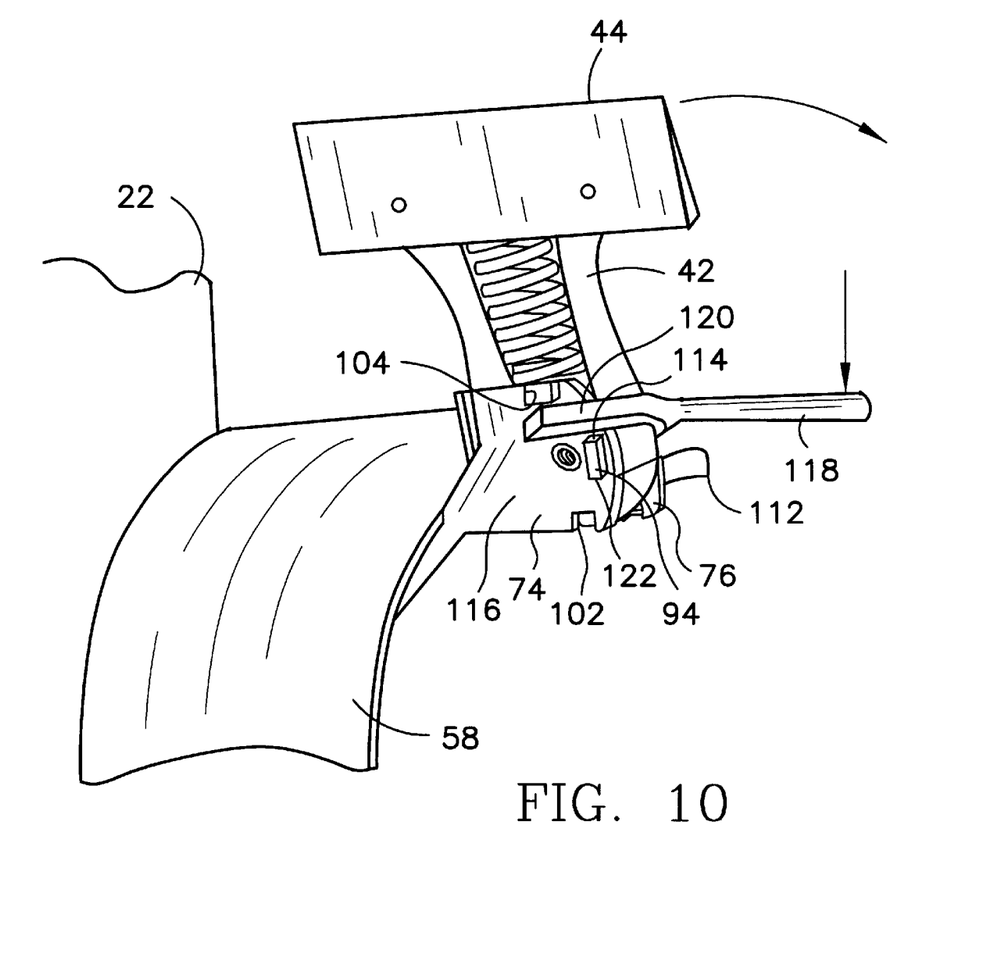
FIG. 10 is an enlarged partial elevational view of a novel chopping apparatus which displays a tool utilized on one of the arms of the chopping apparatus to unlock one of the arms from the extended position and thereafter allow a user to move the arm to the retracted position.

Referring now to FIG. 10, the first ear 74 and the second ear 76 each include an outer surface 116 having a fulcrum block 94 extending generally perpendicular therefrom. Each fulcrum block 94 comprises an inner portion 114 and an outer portion 122. The fulcrum block 94 rigidly attaches to the outer surface 116 of the first ear 74 and the second ear 76 at a location proximate to the cammed portions 112 so that a user may insert a forked tool 118, having a fork portion 120 thereon, between the inner portion 114 of the fulcrum block 94 and each tab portion 100 to dislodge the tab portions 100 from the slots 104 with an applied force. The user exerts a downward force (see arrow) on the tool 118 which causes the fork portion 120 of the forked tool 118 to employ a force on the tab member 88 causing the arm 42 to rotate inwardly (see arrow) and thereafter lock each of the arms 42 in the retracted position A. Similarly, a user may insert the forked tool 118 between an outer portion 122 of each fulcrum block 94 and one of the tab portions 100 to dislodge the tab portions 100 from the second pair of slots 102 and outwardly rotate each of the arms 42 and thereafter lock each of the arms 42 in the extended position B.

Figure 11:
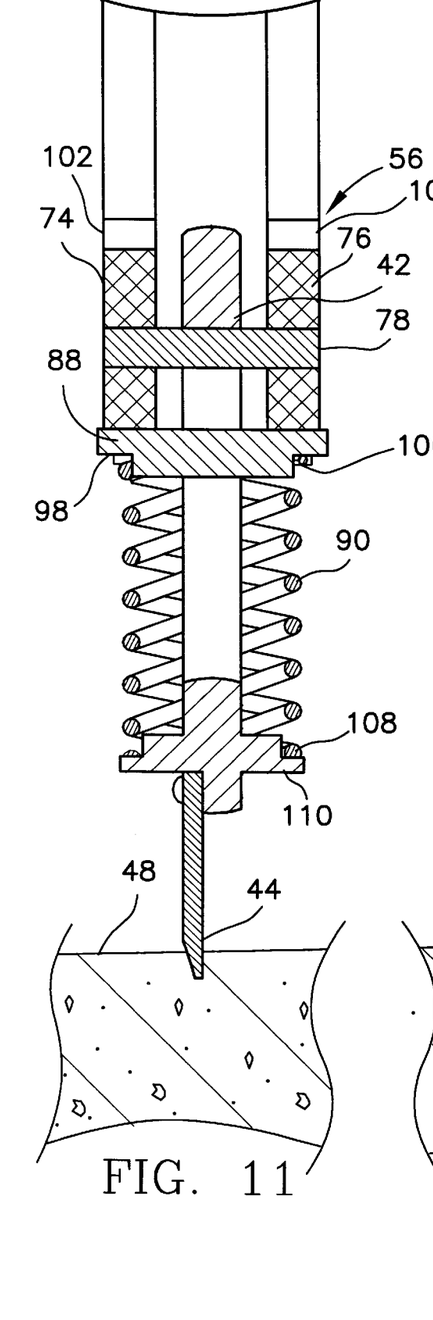
FIG. 11 is an enlarged partial cross-sectional view of a novel chopping apparatus which displays the impact absorption means of one of the arms taken along lines 11—11 of FIG. 1.

Referring now to FIGS. 11 and 12, displays a before and after view of one of the arms 42 fitted with the impact absorption means 67 when the corresponding blades 44 strike the rigid object 66. The impact absorption means 67 comprises: one of the blades 44, one of the arms 42 and the spring 90. In the extended position, each of the arms 42 is locked and restrained from relative movement with respect to the rear wheels 34 (not shown). However when each of the blades 44 strikes a rigid object 66, each of the corresponding arms 42 must recoil, relative to the connecting means 56, otherwise the impact may cause component destruction, especially destruction of the arms 42, blades 44 or connecting means 56. To adequately absorb such an impact each of the arms 42 is allowed to radially move a limited distance equal to the travel required to fully collapse the spring 90. The first end 106 of the spring 90 contacts the second end 98 of the tab member 88 and the second end 108 of the spring 90 contacts the seat 110. The spring 90 exerts an outward force on both the tab member 88 and the seat 110 which forces each of the arms 42 to extend outwardly to its fullest extent. However, when the chopping apparatus 20 encounters the rigid object 66, one of the blades 44 strikes the rigid object 66 and a portion of the weight of the agricultural vehicle 24 is transferred to that blade 44. When this force exceeds the force necessary to displace the spring 90, the spring 90 begins to move and the displacement of the spring 90 in turn relieves the force exerted by the agricultural vehicle 24 on the blade 44. It should be readily understood by those skilled in the art that the spring 90 may be interchangeable with any resilient member which allows displacement of each of the arms 42, with respect to the rear wheels 34, upon a substantial impact between one of the blades 44 and a rigid object 66.

Figure 13:
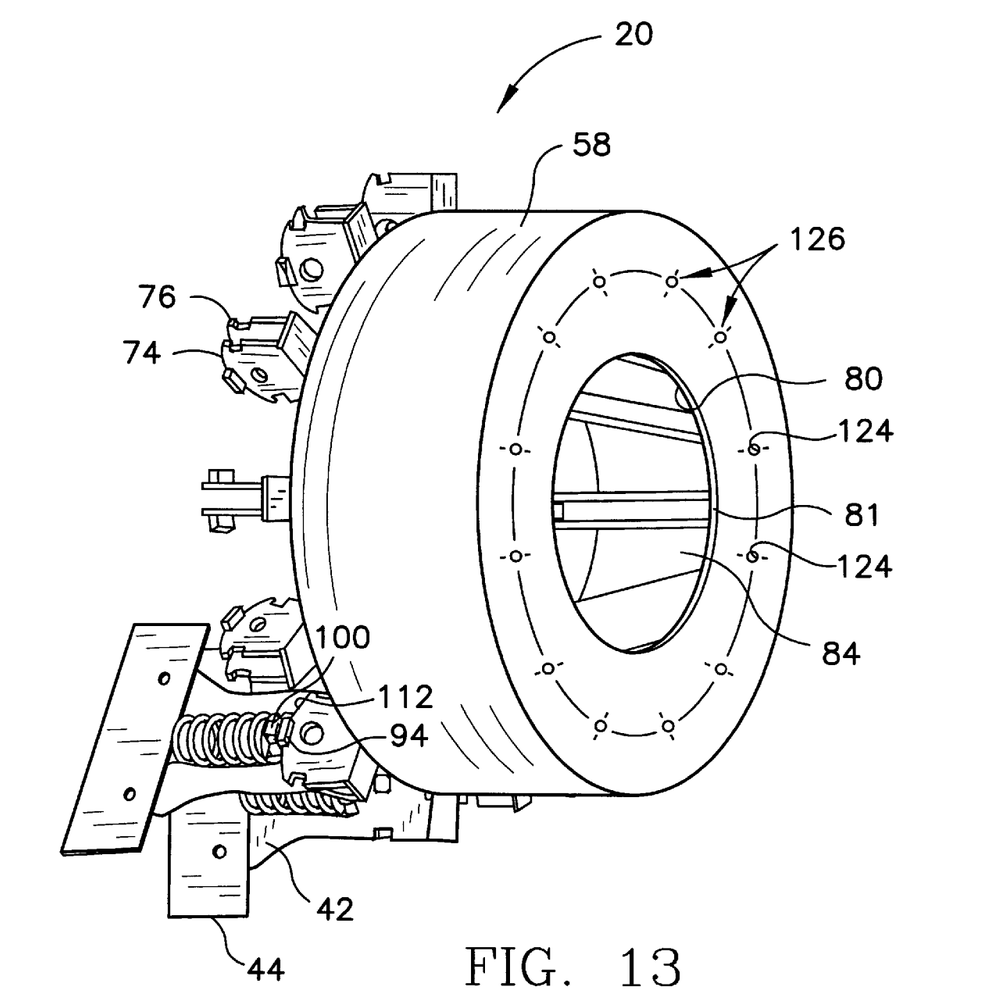
FIG. 13 is a front elevational view of the novel chopping apparatus displaying the unified bolt pattern manifested on the base and common to an agricultural vehicle's wheel.

Referring now to FIGS. 5 and 13, the first surface 80 of the base 58 is disposed vertically and defines base holes 124 and the hub 130 of each of the rear wheels 34 defines hub holes 132 (not shown) which provide for cooperative engagement with the base holes 124 by nut 82 and bolt 128 combinations which mount the base 58 to each of the rear wheels 34.

Alternatively, the first surface 80 of the base 58 may mount each chopping apparatus 20 to at least one of the rear wheels 34 of the agricultural vehicle 24 using the standard vehicle lug pattern 126 which includes each bolt 128. The base holes 124 correspond to bolts 128 of the standard vehicle lug pattern 126. The user first removes each existing nut 82 from bolts 128 extending from a hub 130 (not shown) of the agricultural vehicle 24. Second, the user places the base 58 thereupon the bolts 128 so that each of the bolts 128 extends therethrough each of the rear wheels 34 of the agricultural vehicle 24 and the corresponding base 58. Third, a user threads each nut 82 onto one of the corresponding bolts 128 and tightens each nut 82 to a manufacturer's specified wheel torque.

Referring now to FIG. 14, the chopping apparatus 20 is shown mounted to a wheel 22 of the agricultural vehicle 24. More specifically the bolts 128 are radially spaced in a standard vehicle lug pattern 126 to which accommodates a substantially similar pattern of base holes 124. The base is cinched tight against one of the front wheels 22 or rear wheels 34 and thereafter the corresponding nut 82 is threaded on one of the bolts 128.

What is claimed is:

1. A chopping apparatus for mounting on at least one tire carrying wheel of a vehicle comprising:
   a. a base, said base having a first surface and a periphery portion thereon, said base removably attaching to said at least one tire carrying wheel;
   b. a plurality of spaced arms, said plurality of spaced arms each having a first end, a second end and an aperture disposed therethrough;
   c. arm connecting means for pivotally connecting said first end of each said plurality of spaced arms to said periphery portion of said first surface of said base, said second end of each said plurality of spaced arms extending radially and outwardly therefrom;
   d. a plurality of blades, each of said plurality of blades removably attached proximate said second end of each of said plurality of spaced arms; and
   e. arm locking means for substantially restraining said plurality of spaced arms in a radially outwardly chopping position and a retracted radially inwardly transporting position.

2. The chopping apparatus of claim 1, wherein said base is substantially cylindrical.

3. The chopping apparatus of claim 2, wherein said base includes at least one aperture longitudinally therethrough said first surface of said base to facilitate cooperation with a standard lug pattern.

4. The chopping apparatus of claim 1, wherein said arm connecting means is a clevis.

5. The chopping apparatus of claim 1, wherein said plurality of arms are locked and generally perpendicular to said first surface of said base.

6. The chopping apparatus of claim 1, wherein said base is generally circular and said plurality of arms are arranged at substantially equal intervals on a circle generally concentric with said base.

7. The chopping apparatus of claim 1, wherein said arm connecting means comprises:
   a. a first ear rigidly connected to said first surface of said base proximate said periphery portion thereof, each said first ear defining a first ear aperture;
   b. a second ear rigidly connected to said first surface of said base proximate said periphery portion thereof, each said second ear defining a second ear aperture;
   c. said first end of each of said respective arms;
   d. a pin; and
   e. said base, said first end of each of said arms being rotatably disposed therebetween said respective first ear and said respective second ear, each first ear aperture aligning with said second ear aperture, each said pin interferingly fitting therein each said first ear aperture and each said second ear aperture while allowing one of each of said arms to freely move about each said pin.

8. The chopping apparatus of claim 7, wherein each of said arms is generally elongated and defines an elongated aperture therethrough to facilitate both translational and rotational movement of each of said arms about each said pin.

9. The chopping apparatus of claim 8, wherein each said arm locking means comprises:
   a. one of said plurality of spaced arms;
   b. a tab member, said tab member comprising a first end proximate said first ear and a second end extending therefrom, said first end of said tab member comprising at least one tab portion;
   c. a biasing member; and
   d. said first ear defining at least one first slot therethrough and at least one second slot therethrough, said first slot facing the center portion of the wheel, said second slot opposite thereto said first slot and facing a tread surface of the tire, said tab member reciprocatively disposed within said aperture of said one of said plurality of spaced arms, said at least one tab portion communicative with at least one first slot whereby said one of said plurality of spaced arms is restrained wherein said second end of said one of said plurality of spaced arms is proximate to the center portion of the wheel, said at least one tab portion communicative with at least one second slot whereby said one of said plurality of spaced arms is restrained wherein said second end of said one of said plurality of spaced arms is proximate to a traction surface of the tire, said biasing member forcibly contacting said second end of said tab member to thereby restrain said one of said plurality of arms.

10. The chopping apparatus of claim 7, wherein each said arm locking means comprises a detent.

11. The chopping apparatus of claim 9, wherein said biasing member is a spring.

12. The chopping apparatus of claim 9, including a means for impact absorption comprising:
   a. said one of said plurality of arms, each said one of said plurality of spaced arms being radially movable, said second end of each of said plurality of spaced arms defining a seat; and
   b. a resilient member having a first end contacting said second end of said tab member and a second end of said resilient member contacting said seat, said resilient member exerting an outward force on said tab member whereby said one of said plurality of arms extends outwardly, said blade striking a rigid object urges said corresponding arm radially inwardly.

13. The chopping apparatus of claim 6, wherein said resilient member of each said impact absorption means comprises a spring.

14. A chopping apparatus for mounting on at least one tire carrying wheel of a vehicle wherein a tire of said at least one tire carrying wheel includes a contact surface continuously in contact with terrain comprising:
   a. a base attached to said at least one tire carrying wheel of said vehicle, said base comprising a first surface, said first surface generally perpendicular to the contact surface;
   b. a plurality of spaced arms, said plurality of spaced arms each having a first end and a second end, said first end of each of said arms rigidly attached to said base and said second end extending outwardly therefrom; and
   c. a plurality of blades, each of said plurality of blades removably attached proximate said second end of each of said plurality of spaced arms, said blades substantially penetrating terrain adjacent the contact surface of a tire on the vehicle.

* * * * *